(12) United States Patent
Revanur et al.

(10) Patent No.: US 11,032,282 B2
(45) Date of Patent: Jun. 8, 2021

(54) INTERLINKING CROSS PLATFORM AUTHORIZATION AND PROCESSING

(71) Applicant: NCR Corporation, Duluth, GA (US)

(72) Inventors: Nagendra Kumar Revanur, San Jose, CA (US); Yehoshua Zvi Licht, Alpharetta, GA (US); Girish Narang, Santa Clara, CA (US)

(73) Assignee: NCR Corporation, Atlanta, GA (US)

( * ) Notice: Subject to any disclaimer, the term of this patent is extended or adjusted under 35 U.S.C. 154(b) by 207 days.

(21) Appl. No.: 15/142,112

(22) Filed: Apr. 29, 2016

(65) Prior Publication Data

US 2017/0318015 A1 Nov. 2, 2017

(51) Int. Cl.
*H04L 29/06* (2006.01)
*G06F 21/60* (2013.01)
*G06F 21/62* (2013.01)
*G06Q 30/06* (2012.01)
*G06Q 30/02* (2012.01)

(52) U.S. Cl.
CPC ............ *H04L 63/10* (2013.01); *G06F 21/604* (2013.01); *G06F 21/6245* (2013.01); *G06Q 30/0201* (2013.01); *G06Q 30/0203* (2013.01); *G06Q 30/0601* (2013.01); *H04L 63/08* (2013.01)

(58) Field of Classification Search
CPC combination set(s) only.
See application file for complete search history.

(56) References Cited

U.S. PATENT DOCUMENTS

| 8,943,027 B1* | 1/2015 | Dwan ................... G06F 16/215 707/664 |
| 2007/0006291 A1* | 1/2007 | Barari ................... G06F 21/335 726/10 |
| 2007/0168228 A1* | 7/2007 | Lawless ................. G16H 40/67 705/2 |
| 2010/0053167 A1* | 3/2010 | Shinohara ............. G06Q 10/10 345/440 |
| 2010/0138470 A1* | 6/2010 | McCoy ................. G06Q 10/06 709/201 |
| 2010/0217642 A1* | 8/2010 | Crubtree ............... G06Q 10/00 705/7.12 |
| 2013/0080469 A1* | 3/2013 | Choi .................... G06F 17/3064 707/772 |

(Continued)

FOREIGN PATENT DOCUMENTS

WO WO 2006135726 A2 * 12/2006 ............. D06F 33/02

OTHER PUBLICATIONS

NPL1 taken from URL: https://www.fidelity.com/cash-management/faqs-full-view taken from https://web.archive.org archived on Jan. 22, 2014 hereinafter Fidelity 1.*

(Continued)

*Primary Examiner* — Richard A McCoy
(74) *Attorney, Agent, or Firm* — Schwegman, Lundberg & Woessner

(57) ABSTRACT

A user authorizes cross-platform interlinking or user data. The cross-platforms are mined for user-authorized data. The data is processed into graph data and metrics data. The graph data is presented as an interactive graph interface to a user that responds to user selections/directions to provide user-defined views and levels of detail.

19 Claims, 5 Drawing Sheets

(56) References Cited

U.S. PATENT DOCUMENTS

| | | | |
|---|---|---|---|
| 2014/0229346 A1* | 8/2014 | Caldwell | G06Q 40/12 705/30 |
| 2014/0298419 A1* | 10/2014 | Boubez | H04L 63/08 726/4 |
| 2015/0131977 A1* | 5/2015 | Beckers | G05D 23/1904 392/441 |
| 2016/0080428 A1* | 3/2016 | Fan | H04M 3/493 709/228 |
| 2016/0080567 A1* | 3/2016 | Hooshiari | H04M 3/42229 379/88.01 |

OTHER PUBLICATIONS

NPL 2 taken from URL: https://www.fidelity.com/security/our-security-measures taken from https://web.archive.org archived on Apr. 6, 2016 hereinafter Fidelity 2.*

NPL3 taken from URL: https://scs.fidelity.com/webxpress/help/topics/learn_history.shtml#brokerage taken from https://web.archive.org archived on Oct. 5, 2015 hereinafter Fidelity 3.*

* cited by examiner

INTERLINKING CROSS PLATFORM AUTHORIZATION AND PROCESSING

BACKGROUND

Nearly everything about a consumer is being captured daily and private information about the consumer is stored on a variety of online-accessible services. In fact, almost every aspect of a consumer's activity and habits is being captured in electronic format somewhere at any given point in time.

Today, consumers engage in transactions across multiple different lines of business and platforms. These transactions are recorded separately; the systems that record them have little to no knowledge of each other or, even, the consumer in some instances.

For example, a consumer visits a retail store for purchasing some items, some of which may have promotions and/or discounts. The discounts may necessitate that the consumer provide a loyalty card with the retail store. The retail transaction along with the individual line-items and the loyalty card information is recorded in the retail system (platform for a line of business (LOB)) of the retail store. The same consumer may pay for the transaction using a credit card issued from a particular bank. The credit card information is recorded and known to the particular bank's system (a second and different platform for a different LOB). The retail system and the banking system are separate platforms and LOB; therefore, there are two separate transactions noted in each system (one by the retail system and one by the banking system) and the two separate transactions are not interlinked in any manner with one another such that the consumer can identify and easily discover that two separate transactions reported to the consumer on two separate monthly reports are one and the same transaction.

Presently, there is no mechanism for interlinking and processing information across multiple disparate platforms (LOB), such that consumers and retailers can identify, discover, and process information more efficiently.

SUMMARY

In various embodiments, methods and a system for interlinking cross platform authorization and processing are presented.

According to an embodiment, a method for interlinking cross platform authorization and processing is provided. Specifically, in an embodiment, an authorization is obtained for interlinking first platform data with second platform data. Next, the first platform data with the second platform data in response to the authorization.

DETAILED DESCRIPTION

Figure 1A:
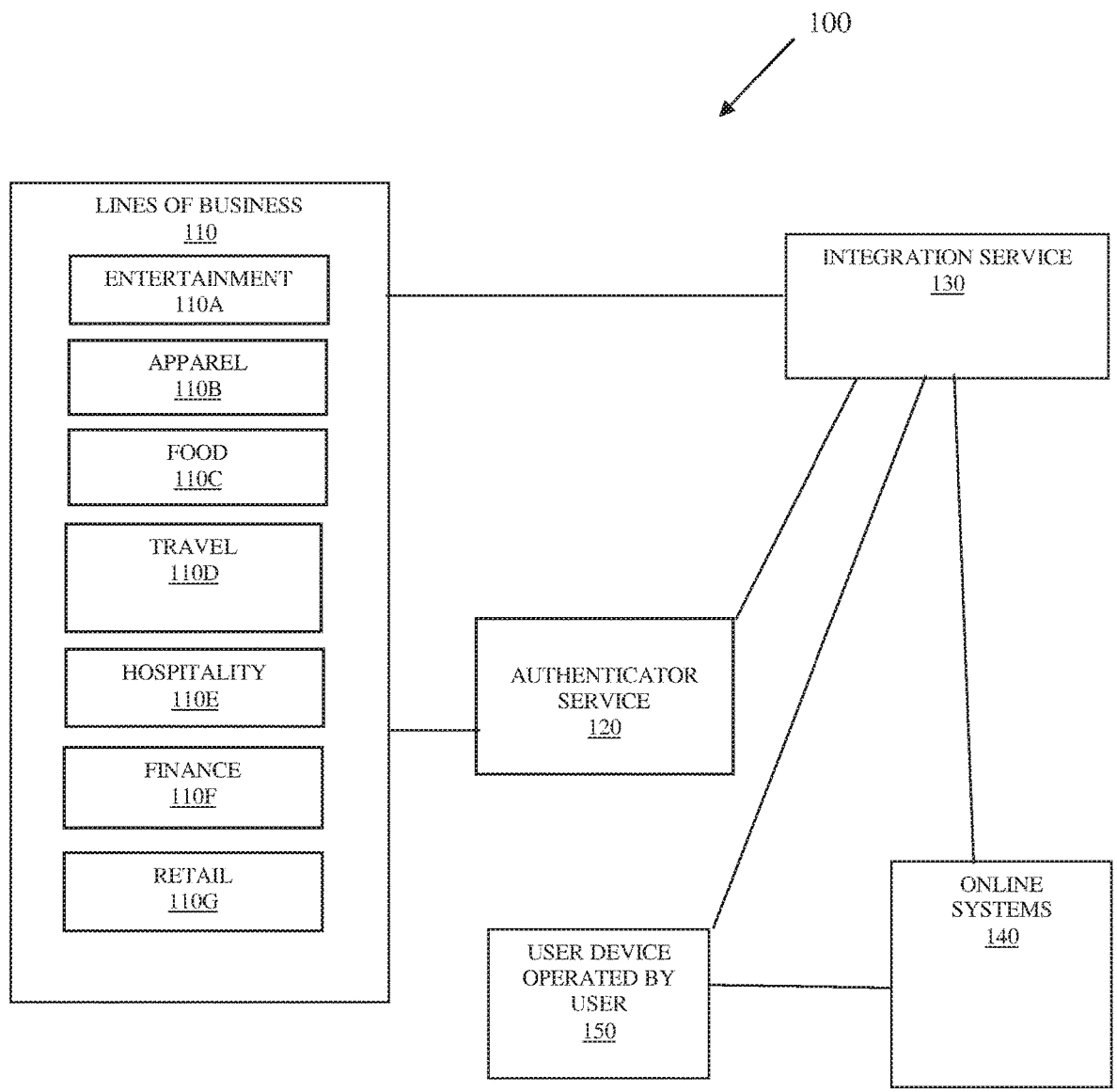
FIG. 1A is a diagram of a system for interlinking cross platform authorization and processing, according to an example embodiment.

FIG. 1A is a diagram of a system for interlinking cross platform authorization and processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the interlinking cross platform authorization and processing presented herein and below.

Moreover, various components are illustrated as one or more software modules, which residing in non-transitory storage and/or hardware memory as executable instructions that when executed by one or more hardware processors perform the processing discussed herein and below.

The techniques, methods, and systems presented herein and below for interlinking cross platform authorization and processing can be implemented in all, or some combination of the components shown in different hardware computing devices having one or more hardware processors.

The system 100 includes various lines of business (LOB) data repositories 110, an authentication service 120, an integration service 130, a variety of online systems 140 (or online services accessible electronically over a network (wired, wirelessly, or a combination of wired and wireless)), and at least one user device operated by a user (or a customer of one of the online systems 140).

The LOB repositories 110 maintain transaction data for consumers within these different LOB repositories 110. The transaction data can include such things as: purchases, entertainment ticket redemption, gaming, social media, and the like. Again, a consumer's activity can be captured in one of these LOB repositories 110 based on activity performed on the user-operated device 150 or based on an operator of one or more of the online systems 140 causing the consumer's activity to be captured and entered into one or more of the LOB repositories 110.

In the embodiment, illustrated in the FIG. 1A, the LOB repositories 110 include for: entertainment 110A, apparel 110B, food 110C, travel 110D, hospitality 110E, finance 110F, and retail 110G.

The transaction data (purchases, social media transactions, venue ticket redemption, gaming, etc.) may be initially captured by a variety of online systems 140 or provided from online systems 140 to third-parties for management within the LOB repositories 110. In fact, some of this data within the LOB repositories 110 can be purchased by third-parties for reselling to other marketers, retailers, etc.

The authentication service 120 is one or more software modules represented as executable instructions that execute on one or more processors of one or more network devices. The integration service 130 is one or more software modules represented as executable instructions that execute on one or more processors of one or more network devices.

The integration service 130 interacts with the authentication service 120 for purposes of establishing a global cross-LOB identity for a given consumer.

During operation of the system 100, a user is presented with an interface on the user-operated device 150 requesting the user to register with the integration service 130. This entails obtaining through the interface a user identity and credentials for authenticating for access to the integration service 130. Once registered, the user has online access through the interface (such as a mobile application executing on the user device 150) for interacting with a user-facing interface of the integration service 130.

Next, the integration service 130 requests user authorization to establish a global identity for the user across multiple LOB. For each different LOB, the interface request identifying information for the user that can uniquely identify the user within a specific LOB 110. The identifying information for the user can be unique to an entire LOB or unique to specific businesses within a specific LOB.

Identifying information for the user can include things such as, but not limited to, a loyalty number for a specific business, an account number for a specific business, frequent flyer number, credit card number(s), a government issued identification number(s) (driver's license, passport number, etc.), an email address used with multiple businesses (perhaps across multiple different LOB), a phone number (or numbers) used with multiple businesses (perhaps across multiple different LOB), birth date, home address, and others.

In some cases, the user may authorize credential information for accessing a user account with specific businesses within one or more of the LOB. Here, the user may even supply the login identifier for any such account along with the user's authenticating credentials. This, in some embodiments, permits the integration service 130 to log into a specific business from the online systems 140 as the user to establish a session with a specific business.

Once the appropriate authorizations are obtained from the user for user identifying information and, if desired, access to user accounts as the user through the online systems 140, the integration service 130 can interact with the authentication service 120 to perform a variety of novel and beneficial processing on behalf of the user and/or the online systems 140.

The integration service 130 notifies the authentication service 120 of authorizations identified by the user for each authorized cross-interlinked LOB. The authorization service 120 can then tag transactions across LOB with an authentication token that is linked to a global identifier for the user (global in the sense that the user's authenticated identity to the integration service 130 when the user authenticates is assigned a unique token). The transactions in the LOB are also tagged with LOB identifiers.

Once the integration service 130 has the identifying information and authorizations for the user and has notified the authorizations service of the identifying information and the appropriate LOB, the authorization service 120 can cull the LOB repositories 110 for transactions across multiple LOB and tag those transactions with an authentication token linked to the user.

The integration service 130 dynamically mines, on a per-request basis or on a batch basis, the user-authorized LOB repositories 110 using an APIs for each of the LOB repositories for purposes of accessing transaction data of transactions having the user-supplied identifying information and to identify specific cross-LOB transactions linked to activity of the user. Essentially, the integration service 130 aggregates the user's different known personas for businesses across multiple LOB repositories 110 creating an aggregated or federated repository for the user linked to the global identity (identity known for the user by the integration service 130).

The transaction data can include a variety of rich data on the user, such as, and by way of example only, customer name, customer account, customer identifier, credit card used, date and time of transaction, item purchased, retailer where purchased, venue of ticket redemption, type of venue, event held at the venue, restaurant visited, food ordered, amount of transaction, product identifiers, and the like. In fact, anything that is captured electronically during a transaction can be captured. This data when natively captured may be in a retail or venue-specific format or may even be unstructured. The integration service 130 can obtain the transaction data from the LOB repositories 110 or other sources (not shown in the FIG. 1A). That is, it is not necessary for the LOB repositories 110 to have all customer aggregated data housed in an aggregated data store, such that just those transactions for which the transaction data can be obtained (either through licensing, customer approval, retail agreements, and the like) may be aggregated as needed by the authentication service 120. Although, there is no technical impediments to having all such data in the LOB repositories 110 just legal impediments. Therefore, in some cases, the LOB repositories may include all transaction data captured for a customer across all known LOB for the customer.

The authentication service 120 interacts with the integration service 130 to provide a variety of useful features utilizing the user-provided cross LOB authorizations and the global user identity (an aggregated identity including the linkage between unique identity for the user known to the integration service 130 and user identifying information across user-authorized LOB for the user as supplied by the user). Such features (as discussed below), may also be available to employees of the online systems 140 for marketing to the user or user-segments defined for marketing.

For example, the integration service 130 can instruct the authentication service 120 to flag transactions for the user identifying information from the LOB repositories 110 in batch at periodic intervals. A global profile for the user that spans multiple different LOB can then be developed by the integration service 130 analyzing the data. For example, twice a week the user fills his/her gas tank at station Y and buys milk at store X and once a month eats at restaurant Z. Profiles of different global identities (different users) can be classified into similar segments for marketing (based on a scoring algorithm). These segments can be made available to the online systems 140 for marketing. In fact, the criteria for defining the profiles and segments can be defined by the online systems 140 through interfaces to the integration service 130.

When a user logs into the integration service 130, the user-facing interface can push a variety of available features to the user. Such as, "do you want to see all your transaction for retailer X;" "do you want to see all your transactions for credit card Y;" do you want to see all transaction relevant to entertainment;" etc. In response, the integration service 130 instructs the authentication service 120 to provide identifiers for all online systems 140 and LOB for which the user has provided LOB authorizations to interlink. The integration service 130 then fetches from the LOB repositories 110 all relevant transactions (based on the authorized LOB identifiers), and the integration service 130 parses the results and presents a user-readable listing and/or summary back to a user interface of the user device 150 for viewing by the user. Pre-packaged features of the interface can be provided to the user through interaction of the integration service 130 and the user device 150. In addition, the user may custom-define queries that span multiple LOB activity.

Similarly, features available through the integration service 130 and the authentication service 120 can be made available to interfaces of the online systems 140. Here, the true identity of a particular user may remain anonymous to any retailer associated with the online systems 140. The retailer uses interfaces exposed by the integration service 130 to define criteria for defining customer segments and receive back (through processing of the authentication service 120 (as authorized by the user) and the integration service 130) transactional data for defined customer segments for customer transaction data that spans multiple LOB.

The integration service 130 also can represent the aggregated cross-LOB transactions as graph data, which can be processed and rendered in graphical form in the user-facing interface of the user device 150. The graph can also be interactive, such that the user can manipulate the displayed graph data to drill down into finer details associated with the graph data. For example, a user may drill down, by panning a cursor over a graph point and a pop-up window in the user-facing interface displays additional data. The user may also click on graph points to get expanded or different views of the data. Consider a user requesting transactional data for travel 110D and hospitality 110E, the graph may include a configurable x and y axis, with x being dollar amount and y being date. The graph may present money (x axis) spent by the user for two LOB over calendar date (y axis). The graph may show the hospitality 110E in a black color line and travel 110D in a blue color line. The lines may or may not intersect one another. The user can select (cursor over) to obtain specific transaction information, such as hotel reservation on Apr. 1, 2016 at a Holiday Inn, in Duluth Ga. If the user were to double click a graph point, additional details may come be displayed, such as reservation number, amount of bill, etc. Some transaction data may for transactions that are not yet completed, such as a flight (travel 110D) or even the above-mentioned hotel reservation. Here, the user can interact with the dynamic and interact graph interface (presented on the user device 150 by the integration service), to obtain flight number information, time of departure etc. Therefore, a user can also use the cross authorized LOB for information that the user may forget and need to know to complete a particular transaction.

Figure 1B:
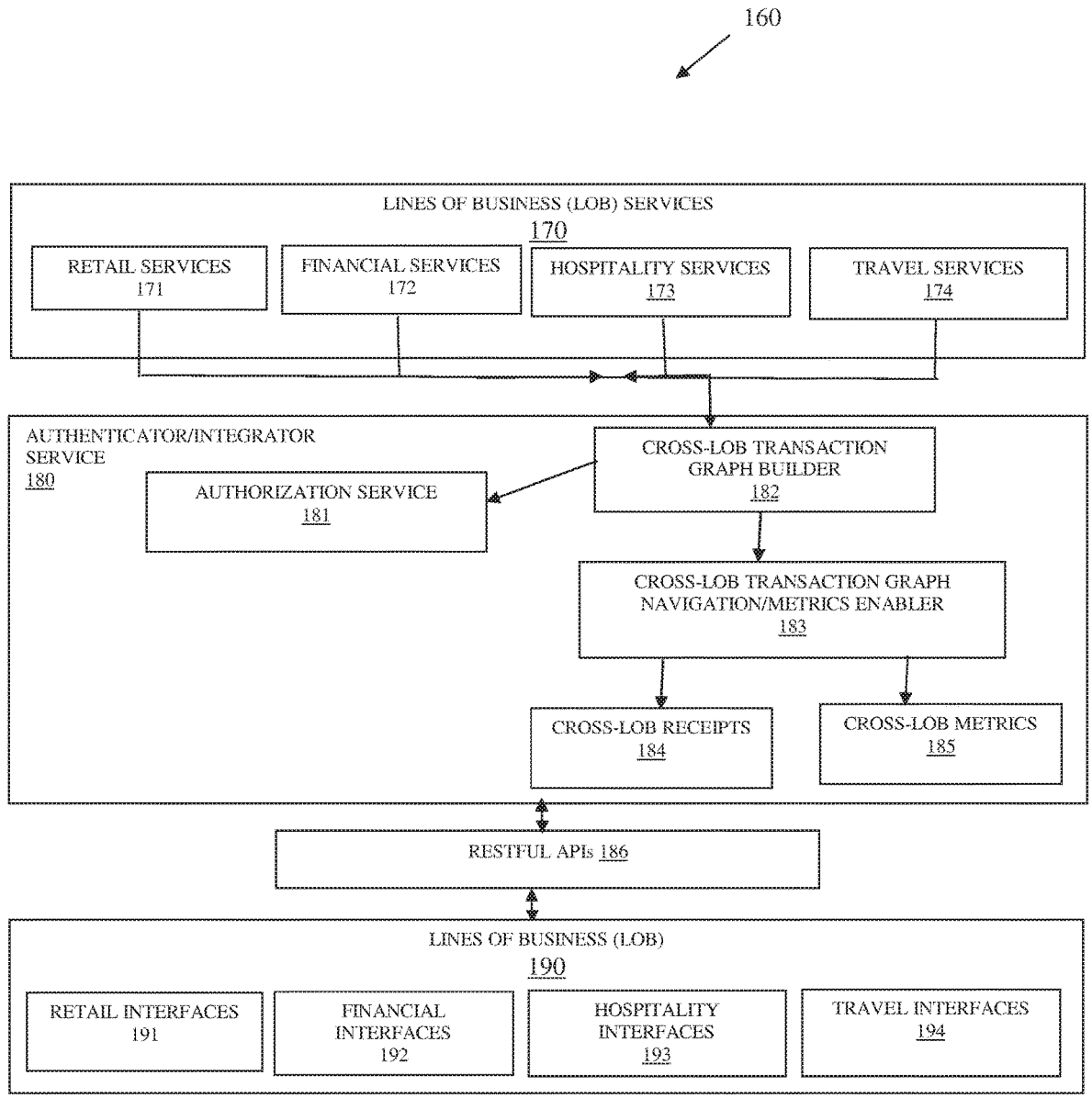
FIG. 1B is a diagram of a sample architecture for practicing interlinking cross platform authorization and processing according to an example embodiment.

The FIG. 1B is now discussed within the context of additional features that can be provided through the novel processing of the authentication service 120 and the integration service 130 when providing interlinking cross platform authorization.

The FIG. 1B is a diagram a sample architecture 160 for practicing identity interlinking cross-LOB authentication and processing according to an example embodiment.

The architecture 160 includes a plurality LOB services 170, an authenticator/integrator service 180, Representational State Transfer (Restful interfaces) 190, and LOB 190.

The LOB services 170 include (in this sample embodiment) retail services 171, financial services 172, hospitality services 173, and travel services 174.

The authenticator/integration service 180 includes sub-processing modules and data modules that include: an authorization service 181, a cross-LOB transaction builder 182, a cross-LOB transaction graph navigation/metrics enabler, cross-LOB receipts, and cross-LOB metrics 185.

In the embodiment described in the architecture 160, the same features available to a user through the user device 150 are available as was discussed above with the description of the FIG. 1A. Therefore, the user device 150 although not specifically referenced in the FIG. 1B will be referenced in some of the illustrated feature processing discussed with the architecture 160. Moreover, the authenticator/integrator service 180 may be viewed as the combination of the authentication service 120 and the integrator service 140 discussed in the FIG. 1A.

The architecture 160 includes processing for interlinking cross platform authorizations from the authenticator/integrator service 180. These authorizations may include the cross-LOB authorization tokens that are linked to specific user transactions that span different LOB and further linked to the global identity for the user. It is noted that in some of the embodiments, a new and novel interface is deployed and operational on LOB Point-Of-Sale (POS) terminals for obtaining, processing, recognizing, and/or interacting with the authentication/integrator service 180 to perform the features discussed herein with the architecture 160.

The authorization service 181 obtains the cross-LOB transactional data from the LOB services 170 and the cross-LOB transaction graph builder processes the transaction data into graph data. The cross-LOB transaction graph navigation/metrics builder 183 builds the appropriate Application Programming Interface (API) calls to enable the dynamic graph though the Restful APIs 186. Cross-LOB receipts 184 and Cross-LOB metrics 185 are derived by processing the transaction data.

At this point, the interface is now accessible as an interactive graph on a user device 150 and/or to POS terminals/analysts terminals within the LOB 190.

The interface is a dynamic and interactive graph permitting the user to get user-defined views and user-defined level of details for the cross-LOB transactional data. The manner in which the graph is presented can be also user-defined and visual cues for particular LOB 190, particular businesses within a particular LOB 190, particular dollar amounts above a threshold, etc. can all be user defined.

A dynamic interactive graph processes selections from the user through the user-facing interface, which causes the different and varying degrees of metrics 185 and/or receipts to be generated and presented within the graph. The graph can be rolled up to higher-level details and drilled down for fine-level details.

It is now appreciated how the authenticator/integrator service 180 authenticates and interlinks user-authorized cross-LOB transactional data for providing a dynamic and interactive graph representing interlinked cross platform user-defined views. This can be used for novel metrics gathering, novel reporting, and novel marketing that spans multiple LOB.

These and other embodiments are no discussed with reference to the FIGS. 2-4.

Figure 2:
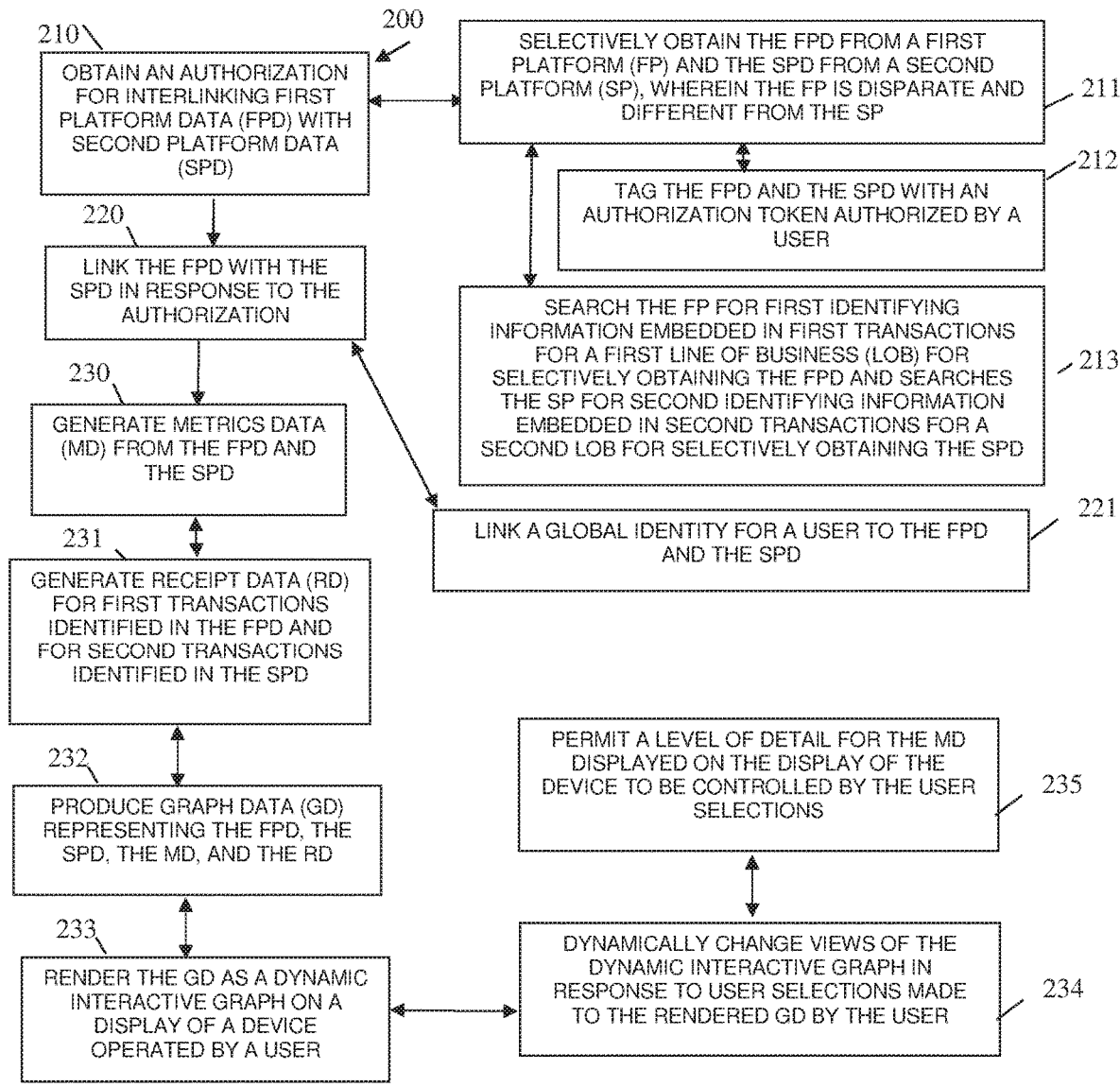
FIG. 2 is a diagram of a method for interlinking cross platform authorization and processing, according to an example embodiment.

FIG. 2 is a diagram of a method 200 for interlinking cross platform authorization and processing, according to an example embodiment. The software module(s) that implements the method 300 is referred to as a "cross-LOB interlink manager." The cross-LOB interlink manager is implemented as executable instructions programmed and residing within memory and/or a non-transitory computer-readable (processor-readable) storage medium and executed by one or more hardware processors of a hardware computing device. The processors of the device that executes the cross-LOB interlink manager are specifically configured and programmed to process the cross-LOB interlink manager. The cross-LOB interlink manager has access to one or more networks during its processing. The networks can be wired, wireless, or a combination of wired and wireless.

In an embodiment, the device that executes the cross-LOB interlink manager is a server.

In an embodiment, the device that executes the cross-LOB interlink manager is a cloud processing environment having a variety of hardware devices logically organized as a single processing environment.

In an embodiment, the cross-LOB interlink manager is the authentication service 120 and the integration service 130.

In an embodiment, the cross-LOB interlink manager is the authenticator/integrator 180.

At 210, the cross-LOB interlink manager obtains an authorization for interlinking first platform data from a first platform with second platform data from a second platform.

According to an embodiment, at 211, the cross-LOB interlink manager selectively obtains the first platform data and the second platform data based on interactions with an authenticated user to the cross-LOB interlink manager (such as in the manners discussed above with respect to the FIGS. 1A and 1B).

In an embodiment of 211 and at 212, the cross-LOB interlink manager tags the first and second platform data with an authorization token authorized by the authenticated user (through appending to the data or through association in a table that maintains transaction identifiers for the data and specific LOB identifiers for specific platforms with a linkage to the authenticated user).

In an embodiment, at 213, the cross-LOB interlink manager searches the first platform data for first identifying information embedded in first transactions for a first LOB for selectively obtaining the first platform data. The cross-LOB interlink manager, similarly, searches the second platform data for second identifying information for the user embedded in second transactions for second LOB for selectively obtaining the second platform data.

At 220, the cross-LOB interlink manager links the first platform data with the second platform data in response to the authorization.

According to an embodiment, at 221, the cross-LOB interlink manager links a global identity for the user to the first and second platform data (the global identity assigned when the user authenticates for access to an exposed user-facing interface of the cross-LOB interlink manager).

At 230, the cross-LOB interlink manager generates metrics data from the first and second platform data. The types of metrics data can be defined by the user based on data types available in the first and second platform data.

In an embodiment, at 231, the cross-LOB interlink manager generates receipt data for first transactions identified in the first platform data and for second transactions identified in the second platform data.

In an embodiment of 231 and at 232, the cross-LOB interlink manager produces graph data representing, the first platform data, the second platform data, the metrics data, and the receipt data.

In an embodiment of 232 and at 233, the cross-LOB interlink manager renders the graph data as a dynamic interactive graph on a display of a device operated by a user.

In an embodiment of 233 and at 234, the cross-LOB interlink manager dynamically changes views of the dynamic interactive graph in response to selections made to the rendered graph data made by the user.

In an embodiment, at 234 and at 235, the cross-LOB interlink manager permits a level of detail for the metric data displayed on the display of the device to be controlled by user selections made by the user when interacting with the dynamic interactive graph through the exposed interface on the user device.

Figure 3:
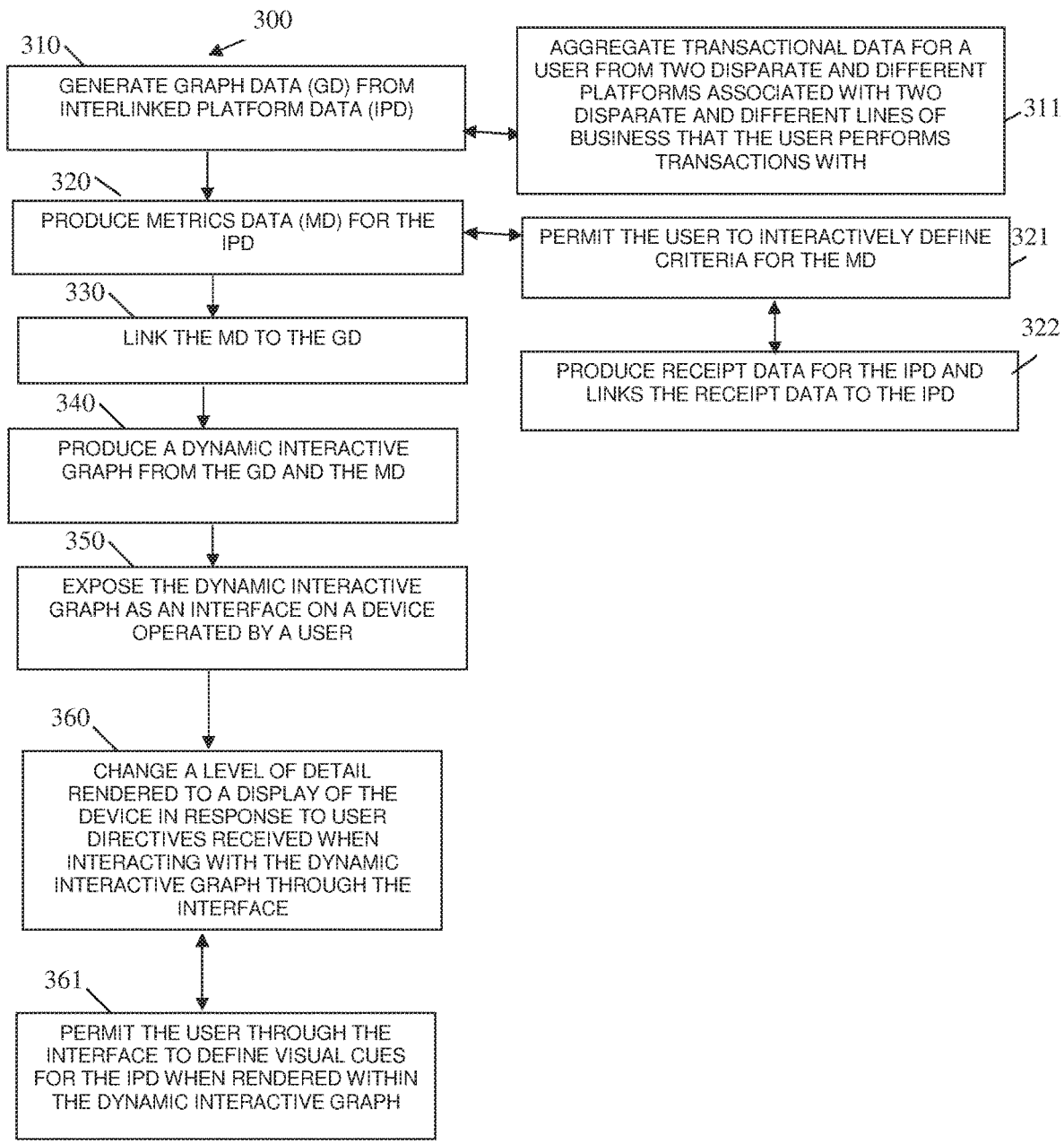
FIG. 3 is a diagram of another method for interlinking cross platform authorization and processing, according to an example embodiment.

FIG. 3 is a diagram of another method 300 for interlinking cross platform authorization and processing, according to an example embodiment. The software module(s) that implements the method 300 is referred to as an "interface manager." The interface manager is implemented as executable instructions programmed and residing within memory and/or a non-transitory computer-readable (processor-readable) storage medium and executed by one or more hardware processors of a hardware device. The processors of the device that executes the interface manager are specifically configured and programmed to process the interface manager. The interface manager has access to one or more networks during its processing. The networks can be wired, wireless, or a combination of wired and wireless.

In an embodiment, the device that executes the interface manager is a server.

In an embodiment, the device that executes the interface manager is a proxy to an online system 140.

In an embodiment, the device that executes the interface manager is a cloud processing environment.

In an embodiment, the interface manager is the authentication service 120 and the integration service 130.

In an embodiment, the interface manager is the authenticator/integrator 180.

In an embodiment, the interface manager is the method 200 of the FIG. 2.

In an embodiment, the interface manager is some combination of the authentication service 120, the integration service 130, the authenticator/integrator 180, and the method 200 of the FIG. 2.

At 310, the interface manager generate graph data from interlinked platform data. The manners in which authorizations for interlinking cross-platform data (such as transaction data that spans different LOB were discussed above with reference to the FIGS. 1A, 1B, and 2).

In an embodiment, at 311, the interface manager aggregate transactional data for a user from two disparate and different platforms associated two disparate and different LOB that the user performs transactions with.

At 320, the interface manager produces metrics for the interlinked platform data. That is the interlinked platform data includes data types for types of metrics (such as dates, amounts, etc.) and the interface manager derives metrics by parsing the data types from the interlinked platform data and perform computations on values for the parsed data types to produce metrics.

In an embodiment, at 321, the interface manager permits the user to interactively define criteria for the metrics data. For example, the user may define a metric for all amounts spent by the user within a specific LOB or for a specific business within the LOB within a user-defined time period, in response the interface manager parses out transactions from the interlinked platform data having identifiers for the specific LOB or specific business and filters those transactions by the user-defined time period. The resulting data is then parsed for the amount spent and summed to produce a metric for a total amount spent by the user. It is noted that this is but one example of many and other situations exists as well and constrained only by what types of data are available in the interlinked platform data (user cross-authorized LOB transactions).

In an embodiment of 321 and at 322, the interface manager produces receipt data and links the receipt data to the interlinked platform data. So, receipts can be produced as well as metrics, the receipts can combine transactions that span multiple different platforms (through the interlinked platform data).

At 330, the interface manager links the metrics data to the graph data.

At 340, the interface manager produces a dynamic interactive graph from the graph data and the metrics data (and through the processing, in some embodiments, the receipt data).

At 350, the interface manager exposes a dynamic interactive graph as an interface on a device operated by a user (this can be done through the Restful APIs 186, as one example).

In an embodiment, at 360, the interface manager changes a level of detail rendered to a display of the device in response to user directives from the user and received by the interface manager when the user interacts with the dynamic interactive graph through the exposed interface. That is, actions of the user, with respect to the graph, determines the presentation of details presented within the display of the user's device.

In an embodiment of 360 and at 361, the interface manager permits the user through the interface to define visual cues for the dynamic interactive graph when rendered within the dynamic interactive graph. That is various platforms and types of data within each platform can be defined with visual cues by the user for easy discernment and recognition by the user when the graph is rendered on the display of the user's device.

Figure 4:
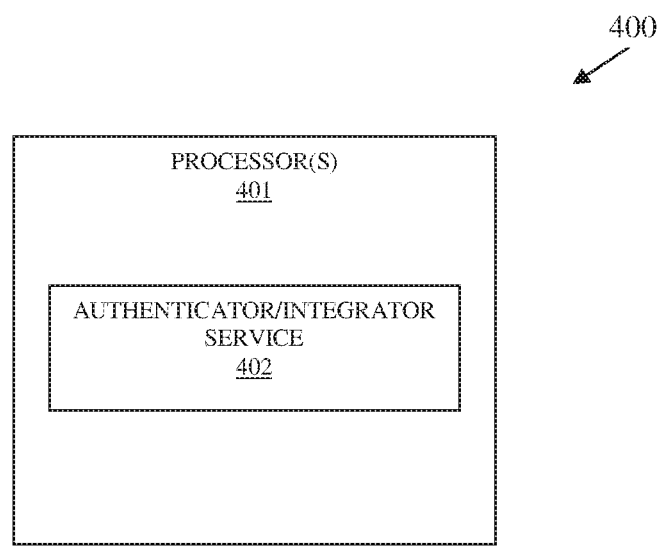
FIG. 4 is a diagram of a system for interlinking cross platform authorization and processing, according to an example embodiment.

FIG. 4 is a diagram of a system 400 for interlinking cross platform authorization and processing, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all, any, or some combination of the processing discussed above with the FIGS. 1A-1B and 2-3.

The system 400 includes at least one hardware processor 401 and an authenticator/integration service 402.

In an embodiment, the hardware processor 401 is part of a server.

In an embodiment, the hardware processor 401 is part of a proxy for an online system 140.

In an embodiment, the hardware processor is part of a cloud processing environment.

The authenticator/integration service 402 is configured to: execute on the processor 401, obtain authorization for interlinking cross-platform data, interlink the authorized cross-platform data, and provide a dynamic interactive graph representing the interlinked authorized cross-platform data as an interface exposed to a device operated by a user.

In an embodiment, the authenticator/integration service 402 is further configured to change a level of detail for a rendered version of the dynamic interactive graph responsive to user directives of the user though the interface.

In an embodiment of the previous embodiment, the authenticator/integration service 402 is further configured to provide metrics derived from the authorized cross-platform data with a user-directed level of detail.

In an embodiment, authenticator/integration service 402 is the authentication service 120 and the integration service 130.

In an embodiment, the authenticator/integration service 402 is the authenticator/integrator service 180.

In an embodiment, the authenticator/integration service 402 is the method 200 of the FIG. 2.

In an embodiment, the authenticator/integration service 402 is the method 300 of the FIG. 3.

In an embodiment, the authenticator/integration service 402 is deployed as a Software as a Service (SaaS) over a network.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   authenticating, by executable instructions that execute on a hardware processor from a non-transitory computer-readable storage medium as a cross platform interlink manager, a user;
   registering, by the cross platform interlink manager, the user;
   acquiring, by the cross platform interlink manager during the registering, multiple accounts of the user, each account associated with transaction processing of the user and with only a particular one of multiple platforms, wherein each of the multiple platforms is distinct from one another and each is exclusively associated with a specific respective distinct online business system, and linking each of the multiple accounts and the corresponding specific online business system to the user;
   establishing, by the cross platform interlink manager, a global identity that links the user to each of the multiple accounts and the cross platform interlink manager;
   obtaining, by the cross platform interlink manager, an authorization for linking first platform data of a first platform selected from one of the multiple platforms with second platform data of a second platform selected from another of the multiple platforms;
   linking, by the cross platform interlink manager, the first platform data with the second platform data in response to the authorization based on a first account from the multiple accounts associated with the user in the first platform and based on a second account from the multiple accounts associated with the user in the second platform by appending to a table, within the first platform, that includes the first platform data, a token linked to the global identity of the user and by appending the token to another table, within the second platform, that includes the second platform data;

aggregating, by the cross platform interlink manager, the first platform data and the second platform data based on the token and creating a federated repository of user transaction data having the first platform data and the second platform data, wherein the creating of the federated repository of the user transaction data occurs for each request associated with accessing the user's transaction data;

providing, by the cross platform interlink manager, an interface with operations within the interface for interacting and custom viewing of the user transaction data from the federated repository;

processing, by the cross platform interlink manager, customized queries provided through the interface by the user using the operations against the federated repository; and presenting, by the by the cross platform interlink manager, results from the processing of the customized queries within the interface.

2. The method of claim 1, wherein obtaining further includes selectively obtaining the first platform data from the first platform and the second platform data from the second platform, wherein the first platform is disparate and different from the second platform.

3. The method of claim 2, wherein selectively obtaining further includes tagging the first and second platform data with an authorization token authorized by the user.

4. The method of claim 2, wherein selectively obtaining further includes searching the first platform for first identifying information embedded in first transactions for a first line of business (LOB) for selectively obtaining the first platform data and searching the second platform for second identifying information embedded in second transactions for a second LOB for selectively obtaining the second platform data.

5. The method of claim 1 further comprising, generating, by the cross platform interlink manager, metrics data from the first platform data and the second platform data.

6. The method of claim 5, wherein generating further includes generating receipt data for first transactions identified in the first platform data and for second transactions identified in the second platform data.

7. The method of claim 6, wherein generating further includes producing graph data representing the first platform data, the second platform data, the metrics data, and the receipt data.

8. The method of claim 7, wherein producing further includes rendering the graph data as a dynamic interactive graph on a display of a device operated by the user.

9. The method of claim 8, wherein rendering further includes dynamically changing views of the dynamic interactive graph in response to user selections made to the rendered graph data by the user.

10. The method of claim 9, wherein dynamically changing further includes permitting a level of detail for the metrics data displayed on the display of the device to be controlled by the user selections.

11. A method, comprising:

generating by executable instructions that execute on a hardware processor from a non-transitory computer-readable storage medium as an interface manager, graph data from interlinked platform data obtained from two disparate and different platforms and maintained in a federated repository representing aggregated user transaction data from the two disparate and different platforms,
  wherein each of the two disparate and different platforms is distinct from one another and each is exclusively associated with a specific respective distinct online business system,
  wherein generating further includes
    identifying each platform that a user performs transaction processing with utilizing a specific user account of a plurality of different accounts associated with that specific online business system, and
    wherein the user is associated with the plurality of different accounts, each of the plurality of different accounts associated with a corresponding transaction processing of the user and with only one of a particular one of the two disparate and different platforms;

establishing a global identity that links the user to each of the plurality of different accounts;

obtaining an authorization for linking first platform data of a first platform selected from one of the two disparate and different platforms with second platform data of a second platform selected from another of the two disparate and different platforms;

linking, by the hardware processor, the first platform data with the second platform data in response to the authorization based on a first account from the multiple accounts associated with the user in the first platform and based on a second account from multiple accounts associated with the user in the second platform by appending to a table, within the first platform, that includes the first platform data a token linked to the global identity of the user and by appending the token to another table, within the second platform, that includes the second platform data;

aggregating the first platform data and the second platform data based on the token and creating a federated repository of user transaction data having the first platform data and the second platform data, wherein the creating of the federated repository of the user transaction data occurs for each request associated with accessing the user's transaction data;

producing, by the interface manager, metrics data for the interlinked platform data that represents the user transaction data within the federated repository;

linking, by the interface manager, the metrics data to the graph data;

producing, by the interface manager, a dynamic interactive graph from the graph data and the metrics data and providing, by the interface data, the dynamic interactive graph as an interface on a device operated by the user; and exposing, by the interface manager, the dynamic interactive graph as the interface on the device for viewing an interaction by the user,
  wherein exposing further includes altering presentations provided within the interface based on user actions on the dynamic interactive graph based on the metrics data for the interlinked platform data.

12. The method of claim 11, wherein generating further includes aggregating transactional data for the user from the two disparate and different platforms associated with two disparate and different lines of business that the user performs transactions with and responsive thereto the creating and maintaining the federated repository having the user transaction data.

13. The method of claim 11, wherein producing further includes permitting the user to interactively define criteria for the metrics data through the interface.

14. The method of claim 13, wherein producing further includes producing receipt data for the interlinked platform data and linking the receipt data to the interlinked platform data.

15. The method of claim 11 further comprising, changing a level of detail rendered to a display of the device in response to user directives received when interacting with the dynamic interactive graph through the interface.

16. The method of claim 15, wherein changing further includes permitting the user through the interface to define visual cues for the interlinked platform data when rendered within the dynamic interactive graph.

17. A system, comprising:
- a non-transitory computer-readable storage medium having executable instructions representing an authenticator/integrator service; a hardware processor; the authenticator/integrator service configured to:
  - (i) execute on the hardware processor from the non-transitory computer-readable storage medium;
  - (ii) obtain authorization for interlinking cross-platform data from a first platform and a second platform that is different and distinct from the first platform from a user during registration of the user for access to the authenticator/integrator service based on first user identifying data obtained from the user for first platform transactions of the user processed on the first platform and based on second user identifying data obtained from the user for second platform transactions of the user processed on the second platform,
- wherein the first user identifying data is a first user account utilized by the user in conducting first transactions only with a first online business system exclusively associated with the first platform,
- wherein the second user identifying data is a second user account utilized by the user in conducting second transactions only with a second online business system exclusively associated with the second platform,
- wherein the first user account is different and distinct from the second user account, and wherein the first online business system is different and distinct from the second online business system,
  - (iii) interlink, by the hardware processor, the cross-platform data by using a global identity assigned to the user to access first platform data associated with the user under the first user account in the first platform using the first online business system, and second platform data associated with the user under the second user account in the second platform using the second online business system, by appending a token, linked to a the global identity, to a table within the first platform that includes the first platform data and by appending the token to another table within the second platform that includes the second platform data and
  - (iv) create the cross-platform data upon each request of the user for the cross-platform data by aggregating the first platform data and the second platform data by respectively mining each of the first platform data and the second platform data using the token,
- and provide a dynamic interactive graph representing the cross-platform data as an interface exposed to a device operated by the user to permit the user to custom interact with the cross-platform data and custom view the cross-platform data from the interface on the device,
- and process custom-user queries provided by the user through the interface against the cross-platform data for user transactions processed on the first platform and the second platform.

18. The system of claim 17, wherein the authenticator/integrator service is configured to:
- (v) change a level of detail for a rendered version of the dynamic interactive graph responsive to user directives of the user though the interface.

19. The system of claim 18, the authenticator/integrator service is configured, to:
- provide metrics derived from the cross-platform data with a user-directed level of detail.

* * * * *